United States Patent [19]
Ernest

[11] 3,918,416
[45] Nov. 11, 1975

[54] ROTARY ENGINE WITH SIDE MOUNTED SPARK PLUGS

[75] Inventor: Robert P. Ernest, Dearborn Heights, Mich.

[73] Assignee: Ford Motor Company, Dearborn, Mich.

[22] Filed: June 6, 1974

[21] Appl. No.: 476,824

[52] U.S. Cl. ............ 123/8.45; 123/8.05; 123/8.09; 123/148 DS
[51] Int. Cl.² .................... F02B 55/14; F02B 53/12
[58] Field of Search ....... 123/8.09, 8.05, 8.13, 8.45, 123/148 DS

[56] References Cited
UNITED STATES PATENTS

| | | | |
|---|---|---|---|
| 3,359,955 | 12/1967 | Turner | 123/8.05 |
| 3,476,092 | 11/1969 | Yamamoto | 123/8.13 X |
| 3,584,608 | 6/1971 | Shibagaki | 123/8.09 X |
| 3,703,163 | 11/1972 | Lamm | 123/8.09 |
| 3,766,893 | 10/1973 | Tredway | 123/8.09 X |
| 3,793,996 | 2/1974 | Scheerer | 123/8.09 |
| 3,844,257 | 10/1974 | Currie | 123/8.09 X |
| 3,848,574 | 11/1974 | Fujikawa | 123/8.09 |

*Primary Examiner*—Clarence R. Gordon
*Attorney, Agent, or Firm*—Joseph W. Malleck; Keith L. Zerschling

[57] ABSTRACT

A rotary engine is disclosed employing a combustion system having a plurality of spark plugs located symmetrically in both side walls of each epitrochoid chamber within the engine. A packaging concept is utilized to incorporate the spark plugs therein while maintaining close nesting of the plugs. Compression pockets in the outer faces of the rotor have a unique cross-shaped or penthouse arrangement effective to augment the spark plug location. The improved combustion system results in increased power, lower emissions and lower fuel consumption.

19 Claims, 19 Drawing Figures

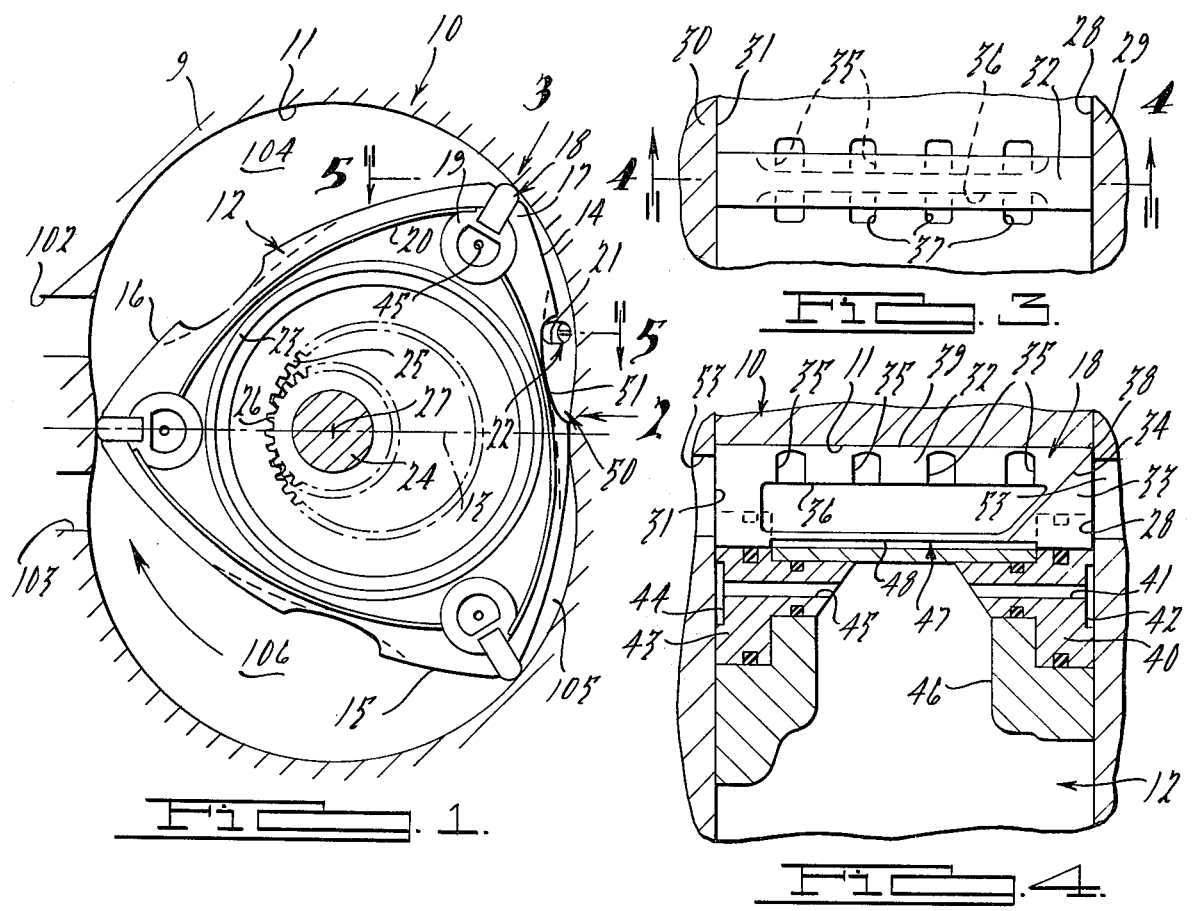
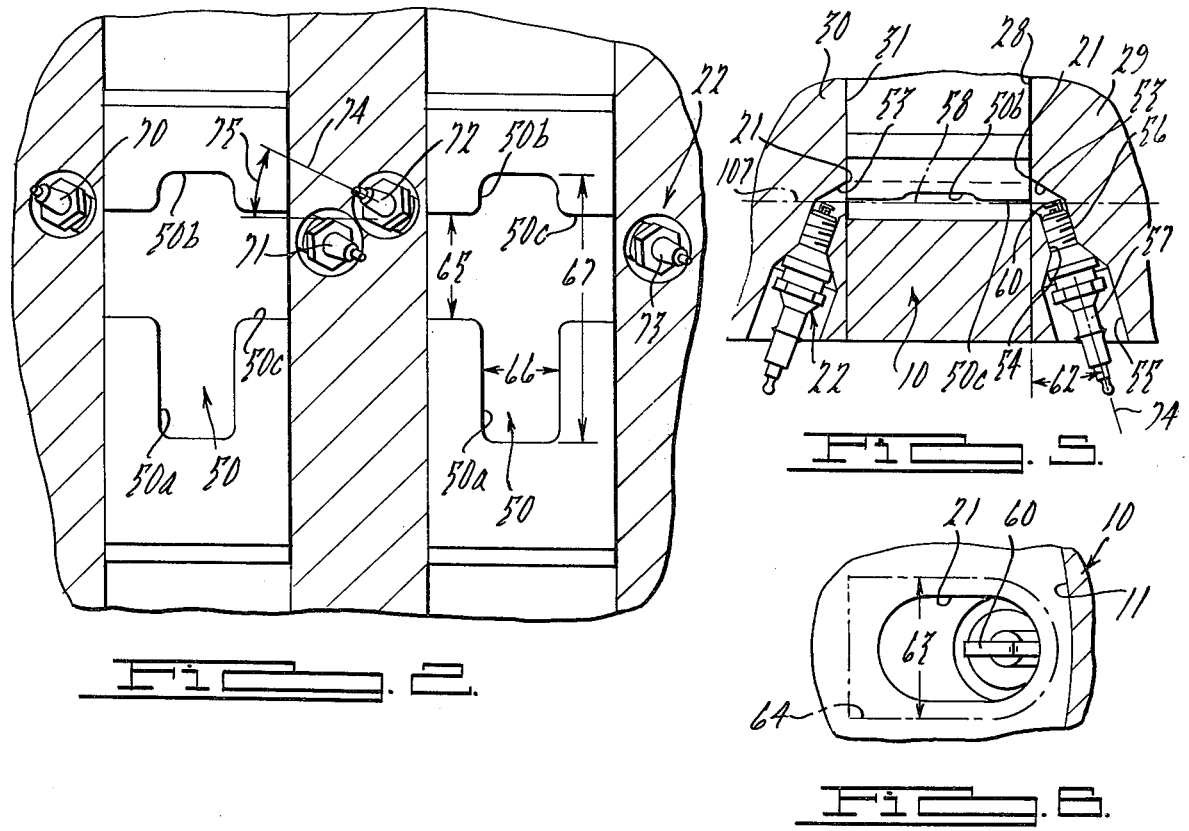

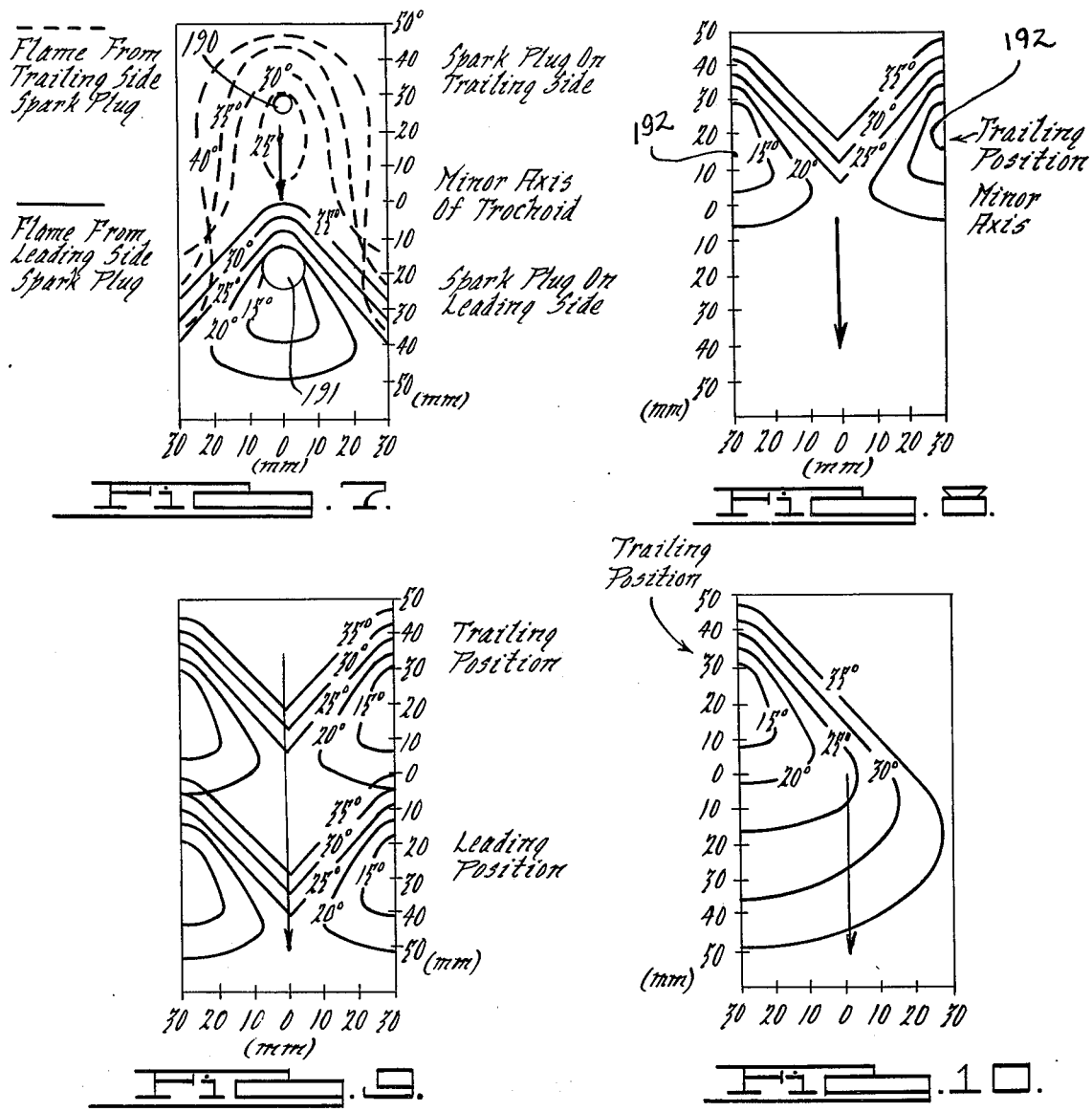
FIG. 7. FIG. 8.
FIG. 9. FIG. 10.
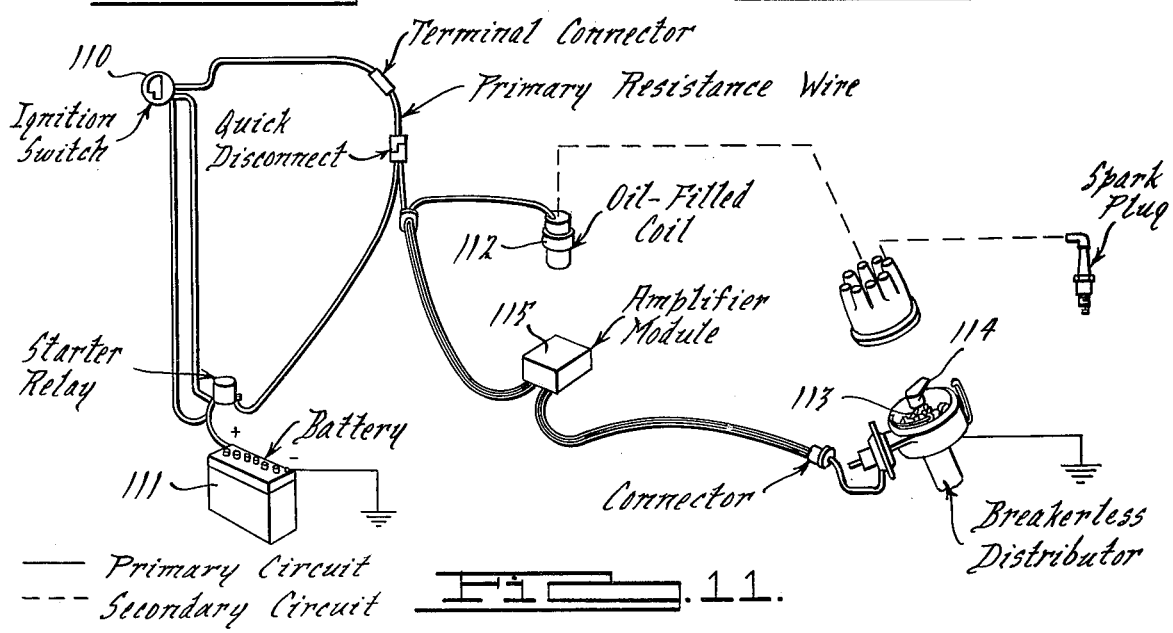
FIG. 11.

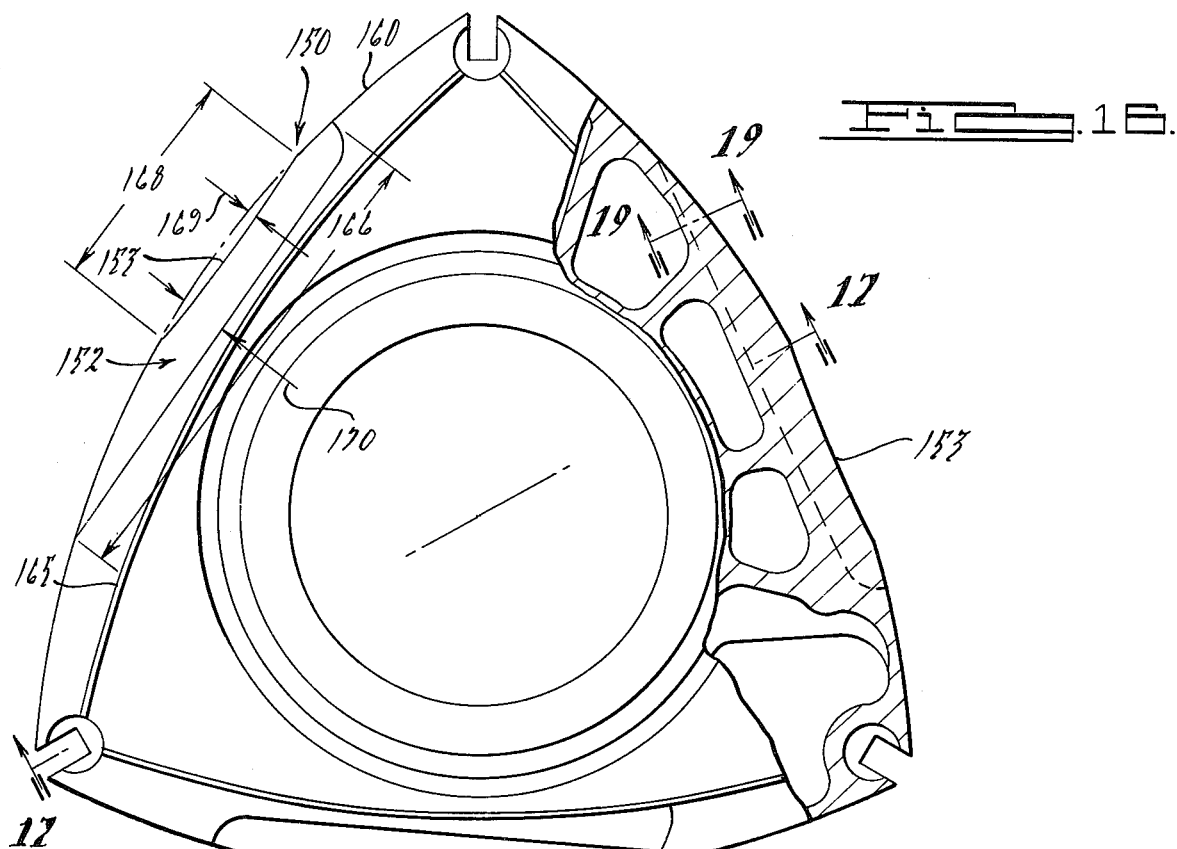
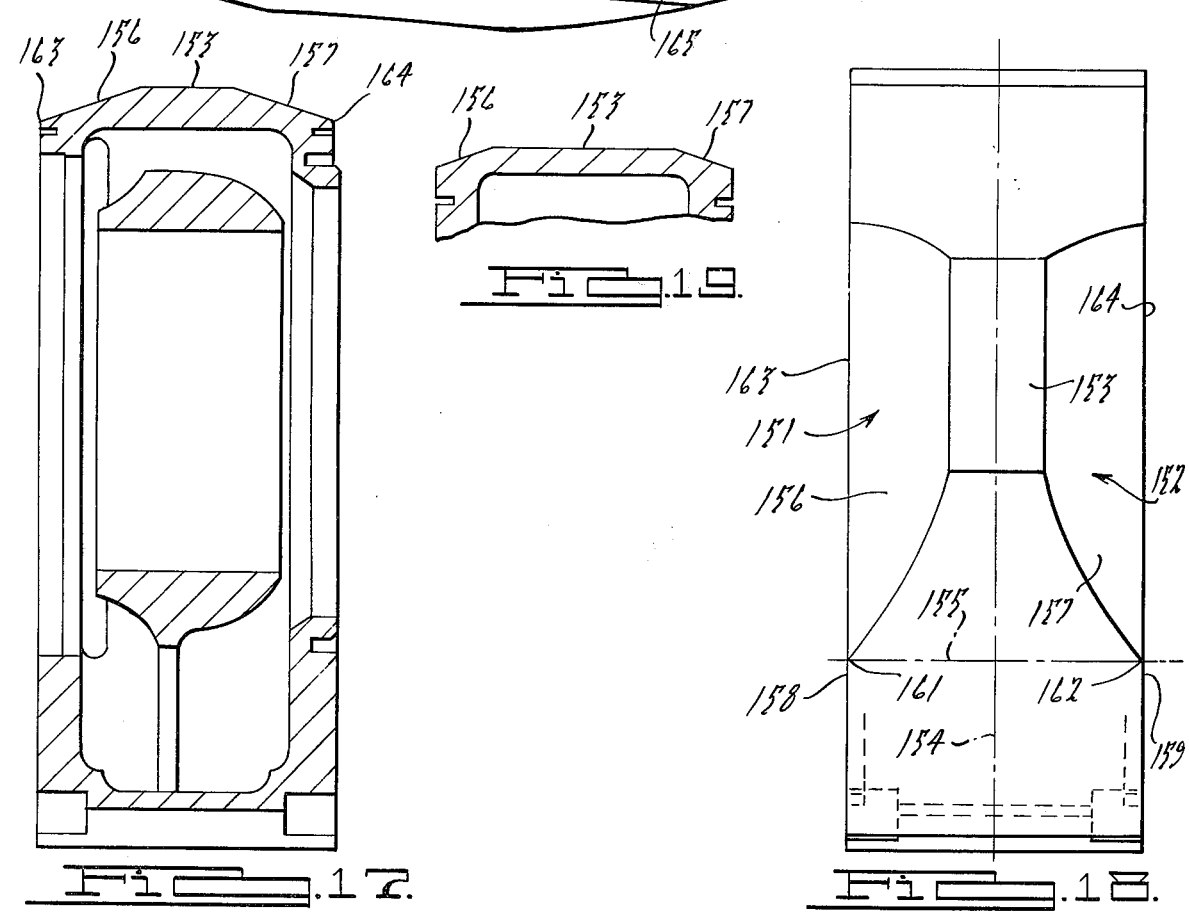

ROTARY ENGINE WITH SIDE MOUNTED SPARK PLUGS

BACKGROUND OF THE INVENTION

Presently available commercial rotary engines for passenger vehicles utilize one or more spark plugs per trochoid chamber, each of which is mounted in the engine's rotor housing. Each spark plug has an electrode open to a spark access opening in the rotor housing's trochoid wall. Such openings have a detrimental effect upon the engine's performance and particularly the apex seal assembly which traverses such spark access openings. The apex seals normally are intended to make a line contact with the rotor housing trochoid wall. The presence of the spark access opening in the rotor housing trochoid wall promotes several distinct problems: (a) gas leakage due to opening size, (b) gas leakage due to material distortion, (c) gas leakage due to high temperature, and (d) loss of lubricating oil film due to presence of the opening. As to (a), intercommunication is premitted between adjacent variable volume chambers (defined by the rotor in cooperation with the housing) when the apex seal traverses one of these openings; this provides a leak path between at least two of the chambers on opposite sides of the apex seal allowing gas blow-by resulting in a power loss and a spit-back condition. As to (b) the insertion by the prior art of a dissimilar metal ring to define the spark access opening in the rotor housing to withstand wear, presents a temperature distortion problem during the high heat conditions experienced by the engine. However, the material defining the spark access opening will distort with or without a dissimilar material or metal ring, due to its proximity to the spark point. Accordingly, the intended line contact in this area is impossible to maintain between the apex seal and the rotor housing. As to (c) and (d), the apex seal is separated from the rotor housing at these hole areas, and therefore the oil wedge, which normally precedes between the seal and housing is lost. Similarly, any normally available oil film is lost due to the extremely high temperatures adjacent such openings; this gives rise to a slip stick or chatter movement of the apex seal, before and after the hole area. Such chatter movement is similar to that experienced by a hard chalk stick racheting against a slate blackboard when moved quickly at a specific angle. The above problems combine to present a critical inability to obtain satisfactory sealing along the epitrochoid surface of the rotor housing for a complete cycle of intake-compression-combustion-exhaust.

Some attempt has been made to remedy these problems by locating one spark plug in one of the side housings of a rotary engine with the electrode open to a spark access hole that extends through one of the interior side walls. The engine's working chambers, which move with the rotor within the housing, while varying in volume are sequentially and periodically opened by the rotor to this one spark access hole. The spark access hole is located relative to the rotor's apex seals and is sized in relation to the corner seal so that it is covered by a corner seal as this seal traverses the hole. Thus gas blow-by is more effectively prevented since a leak path or connection between the chambers is prevented. Unfortunately, such prior art teaching has not proved entirely satisfactory, mainly because of the inability to expose the combustible gases in the variable volume chambers to complete ignition; the single spark opening or openings disposed on only one side of the housing cause excessive spark advance, misfiring and a deficient flame front all resulting in poor engine performance even when compared with an optimum peripheral spark ported engine.

SUMMARY OF THE INVENTION

A principal object of this invention is to provide a rotary internal combustion engine which has a plurality of spark plugs located symmetrically in both of the side walls of each epitrochoid chamber and particularly utilizes a packaging concept effective to incorporate the spark plugs therein while maintaining close nesting of the plugs. It is a further goal that such spark plug arrangement be operable within a multiple rotor engine where a thin intermediate housing serves to separate the epitrochoid chambers.

Another principal object of this invention is to provide an improved rotary internal combustion engine which has noticeably increased power capability over commercially available rotary engines, lower emission levels, and lower fuel consumption by redetermining the location, relationship, number and size, and types of spark plugs utilized in such a rotary engine.

Yet still another object is to provide a rotary internal combustion engine which is effective to operate with symmetrically placed spark plugs in opposing side walls of the epitrochoid chamber, the rotor having compression pockets designed to accommodate and improve the performance when operating with such side spark plugs.

Particular features pursuant to the above objects comprise the use of spark plugs of the surface gap type, each of which are positioned on a precise bias relative to the plane of the side wall of the epitrochoid chamber and relative to the eccentric shaft axis; each of the paired spark plugs have openings which are placed diametrically opposite each other and at a trailing sparking position relative to the compression pocket or at about 15° before top center; the use of a cross-shaped compression pocket, or more preferably, the use of a penthouse design.

SUMMARY OF THE DRAWINGS

FIG. 1 is an elevational view of a portion of a rotary engine showing the interrelationship between the compression pockets and spark plug access openings;

FIG. 2 is an enlarged fragmentary view taken in the direction of line 2 of FIG. 1 and illustrating the spark plug arrangement;

FIG. 3 is an enlarged view of a portion of FIG. 1 taken in the direction of line 3;

FIG. 4 is a sectional view taken substantially along line 4—4 of FIG. 3;

FIG. 5 is an enlarged sectional view taken substantially along line 5—5 of FIG. 1;

FIG. 6 is an enlarged view of the spark access opening of FIG. 1 with the silhouette of an apex seal superimposed thereover;

FIGS. 7–10 illustrate graphically the flame front characteristics of engine with peripheral plugs versus the proposed side plug locations.

FIG. 7 illustrates graphically the flame front characteristics of an engine with a leading and trailing peripheral spark plug location;

FIG. 8 illustrates graphically the flame front characteristics of an engine with two trailing plugs mounted symmetrically opposite each other in the side housings;

FIG. 9 illustrates graphically the flame front characteristics of an engine with two leading and two trailing plugs mounted symmetrically opposite each other in the side housings; and FIG. 10 illustrates graphically the flame front characteristics of an engine with one spark plug in the trailing position located in the side housing;

FIG. 11 is a schematic diagram of a breakerless ignition system particularly useful for the spark plugs of the preferred embodiment of this invention.

FIG. 12 compares peripheral with side wall mounted spark plugs;

FIG. 13 varies the firing sequence of side wall ported plugs at part throttle;

FIG. 14 varies the spark plug configuration with side wall ported plugs at wide-open throttle; and FIG. 15 varies the firing sequence for side wall ported plugs at wide-open throttle.

FIG. 16 is an elevational view of a rotor employing an alternative design for the compression pockets;

FIG. 17 is a sectional view taken substantially along line 17—17 of FIG. 16;

FIG. 18 is a side view of the rotor of FIG. 17 illustrating the plan configuration of the compression pocket.

FIG. 19 is a fragmentary sectional view taken substantially along line 19—19 of FIG. 16.

DETAILED DESCRIPTION

Figure 12:
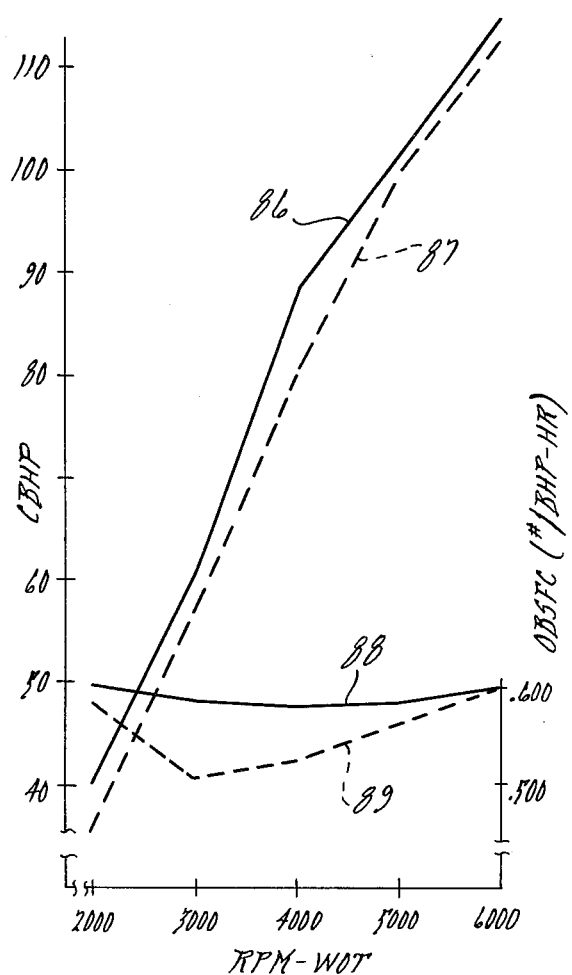
FIGS. 12–15 illustrate graphically operating characteristics of an engine equipped with the structure of FIGS. 1–5.

To overcome the problems of heat distortion in the trochoid wall of a rotary engine, and to solve the dilemma of inadequate ignition and promote higher performance for such an engine, the preferred embodiment illustrated in FIGS. 1–6 was developed. As shown in FIGs. 1–3, the engine comprises a housing 10 which, in a single rotor engine, would have a rotor housing and side housings 30 and 29 together defining a trochoid shaped chamber; the chamber is defined by the inwardly facing side walls 31 and 28 of said side housings and the radially inwardly facing trochoid surface 11 of the rotor housing. A rotor 12 is mounted for rotary movement within the trochoid chamber and has a triangulated elevational configuration to divide the trochoid chamber into three variable volume chambers 104, 105 and 106 (see FIG. 1).

The width of the rotor occupies substantially the entire width of the trochoid chamber and a sealing grid, carried by the rotor, insures gas tight sealing of said variable volume chambers with respect to the housings. The grid system comprises an apex seal assembly 18 disposed at each of the apices 17 of the rotor, corner seals 19, and side seal strips 20 extending between the corner seals. Oil can be present as a film on the trochoid surface 11 as a result of being added in a limited amount to the combustible mixture injected into such chambers; such film facilitates the sealing line between the apex seal assembly and the trochoid surface 11 by maintaining an oil wedge therebetween. A preferred mode of oil addition is through ports in the corner seals which essentially creates a side zone of wiped oil radially from the spark access opening; the addition of oil to the combustible mixture can be eliminated.

Each of the apex seal asemblies may preferably comprise a construction as shown in FIGS. 3 and 4 whereby an elongated piece 32, received within a slot at the apex, extends substantially across the entire width of the rotor; another piece 33 is effective to mate on a bias line 34 with piece 32 for providing lateral adjustment between the side surfaces 28 and 31. Note that during adjustment, a highly limited crevice at 38 may permit gas blow-by is negligible. No unwanted gap can appear between the crown 39 of piece 32 and the trochoid surface 11 since there are no openings in the trochoid surface other than the intake and exhaust port 102 and 103 respectively. The trochoid wall does not have spark access openings therein which result in material distortion due to their presence and proximity to the sparking point. A suitable spring 47 is employed to urge the apex seal assembly into tight line contact with the trochoid surface when no gas pressure is present.

Oil is normally injected in large quantities along the radially inner sides of the rotor assembly, located interior of oil rings 23; in fact, this area is flooded with oil as part of the oil gallery for the gearing, eccentric shaft, and rotor cooling. As indicated earlier, a preferred mode has a limited amount of oil passed through the corner seals 19 to be wiped along a zone of the side housing (the zone being radially inward ot the spark access openings). Oil is received from the internal rotor oil gallery 46 and passes through passages 45 and 41 in respectively opposite corner seals; the passages terminate in a wide recess (44 and 42 respectively) allowing a limited amount of oil to be smeared across the side faces 31 and 28 and to be constantly supplied to the end face of each apex piece 32 and 33. There is a cooperative benefit between this oil wiping system and the side spark plugs of this invention since there is a tendency for less oil gumming of the spark access opening, if this should even become a design problem.

The apex seal piece 32 has a transverse dimension which is slightly smaller than the slot within which it is contained; this facilitates a side seal which must be maintained between the side of the piece and the side of the slot. The piece alternately shifts between the slot sides in response to chamber pressure which reorients in different quadrants of rotary movement. To promote an instantaneous shift, piece 32 has gas communicating passages 35 connecting with a transverse groove 36 in each side of the piece 32. Such passages and groove are symmetrically arranged on opposite sides of piece 32 for promoting a reversible response and insuring a substantially continuous gas tight seal between the trochoid surface 11 and rotor.

The construction of FIGS. 1–3 provides for a four-cycle operation whereby a combustible mixture is inducted through intake port 102, located in the periphery of the trochoid wall 11, and is compressed within one of the variable volume chambers. Compression is brought about by pockets 50 which are defined one each in the outer faces 14, 15 and 16 of the rotor. Each of the pockets have a unique construction which facilitates not only use of the symmetrical ignition means 22 disposed in the side housings but also facilitates particular timing and firing of the ignition means with respect to the stage of the rotor and improved turbulence of the combustible mixture while in the compressed state. Engine power, developed by virtue of the thrust exerted by the combusted gas against the faces of the rotor to turn the rotor in the direction as shown in FIG. 1, is transmitted through the eccentrics to the shaft 24. The gear 25 (mounted on the rotor) engages reduced gear 26 carried by the eccentric shaft 24 (a suitable ratio may be 3:1) to act as a timing device. The rotor moves about the eccentric (not shown), the latter having a center line off set from the center line 27 of the eccentric shaft. The variable volume chambers change their silhouette such as shown in FIG. 1; chamber 104 is shown in the changeover position from the intake cycle to the compression cycle; chamber 105 is in the fully compressed condition and ignition means 22 is ready for immediate firing; chamber 106 has just completed the power or expansion cycle and is beginning the exhaust cycle whereby gases will be rejected through port 103.

The Ignition Means

The ignition means 22 of this invention uniquely comprises symmetrically arranged and precisely located spark plugs effective to apply a spark through the side surfaces 31 and 28 of the trochoid chamber. This invention is particularly adaptive to a multiple rotor engine which is shown in FIG. 2. The rotors are shown in side-by-side firing position relative to the adjacent spark plugs for illustration only, but only one at a time would arrive in such position. Here, four plugs 70, 71, 72 and 73 are employed; two each for each trochoid chamber. For each trochoid chamber, the spark plugs are related symmetrically and in pairs; the spark electrode 60 for each of the spark plugs is located on a common line 107, as shown in FIG. 5. Each spark plug is threadably received in a threaded bore 54 having the fragile portion of the spark plug 57 extending through an enlarged passage 55. The spark electrode, in the construction of FIG. 5, is disposed at the intersection between passage 53 and the threaded passage 54 and is oriented so that the ground electrode has its support remote from edge 21. Passage 53 enters upon the side wall of the trochoid chamber resulting in a configuration defined by edge 21. The width of opening or edge 21 is smaller than the width 63 of the apex seal strip 32 taken between the side surfaces 64 of the apex seal (see FIG. 6). This facilitates complete closure of the spark port openings as the apex seal traverses the same; there is no opportunity for interchamber communication during such momentary traverse.

An electrical supply system for firing the side ported spark plugs is illustrated in FIG. 11. This system is of the breakerless type. With the ignition switch 110 "on", the primary circuit is on whereby current flows from the battery 111 to the ignition coil 112. When the armature "spokes" 113 approach the magnetic pick-up coil assembly 114, they induce a voltage which tells the amplifier 115 to turn off the coil primary current. A timing circuit in the amplifier module 115 (not shown) turns the current on again after the coil field has collapsed. The armature turns with the distributor shaft, causing fluctuations in the magnetic field generated by the pick-up coil assembly. These fluctuations cause the amplifier to turn the ignition coil current off and on, causing the high tension spark needed to fire the spark plugs.

When the current is on, it flows from the battery through the ignition switch, the primary windings of the ignition, and through the amplifier module circuits to ground. When the current is off, the magnetic field built up in the ignition coil is allowed to collapse inducing a high voltage into the secondary windings of the coil. High voltage is produced each time the field is thus built up and collapsed. High voltage flows through the high coil tension lead to the distributor cap 116 where the rotor distributes it to one of the spark plug terminals in the distributor cap. This process is repeated for every power stroke of the engine.

The distributor may be equipped with a standard rotor and cap. Vacuum and centrifugal spark advance control units are utilized. The vacuum advance unit governs ignition timing according to engine load, while the centrifugal advance unit governs ignition timing according to engine speed (r.p.m.). In this particular embodiment, the distributor was modified so that the leading distributor triggered four electronic modules and contained a rotary dual level cap and rotor.

It should be pointed out that this invention may operate well with a breakerless ignition since spark voltage can be higher to provide reduced misfiring when carbon or oil deposits collect; however, the invention will also operate with a capitance discharge or breaker type ignition system.

This invention allows spark advance at light loads to be less than peripheral plug engines and preferably at about 35° at light loads. This results in faster burning to provide cleaner emissions and more power.

Spark Access Opening Size

The size of opening defined by edge 21 plays an important role in this invention. It is now been discovered how to increase the size of the spark access opening in accordance with the teaching herein to provide a better flame front with increased power and yet experience no spitback problem or gas leakage. Gas leakage and spitback are two problems which currently plague commercial engines. Spitback is a phenomenon associated with ported rotary engine and which results when the chamber undergoing compression does not close the intake port in advance of ignition; this permits the expanding gases to blow back into the intake port and carburetor causing a spitback condition. To minimize the spitback, the ignition event is timed later but necessitating leading and trailing spark plugs (leading and trailing are terms defining the spark access to the compression pocket of the chamber when in firing position). However, the trailing spark access opening, particularly, introduces considerable gas leakage during compression to lose power. In an attempt to solve this problem, commercial rotary engines either use only a leading spark plug location or make the trailing spark access opening very small (about .17 inch diameter). In either case, inadequate burning of the combustible mixture results. By making the trailing access opening larger will increase gas leakage, such that a .42 inch diamter opening will provide 450% more leakage. Locating the trailing spark location more closely toward the intake port will increase gas leakage dramatically. As much as an 11% horsepower loss at 2,000 r.p.m. can be attributable to the location and size of the trailing spark access opening.

In this invention, the type of apex seal assembly allows the spark access openings to be made considerably larger. Using the same seal width as the prior art, the size of the access opening can be 50% larger or at least one-fourth inch in diameter. The unusual ability of the apex seal assembly to accommodate instantaneous lateral shifting by gas pressure permits the apex seal end area to be increased without an undue penalty from mass increase, thereby allowing the access opening to be made even larger.

Spark Plug Orientation

Each of the spark plugs have a center line which makes an angle not only with a horizontal plane passing through the minor axis 13 but also makes an angle with respect to the plane passing through the side walls. For example, spark plug 72 has a center line which makes an angle 75 with respect to a plane passing through the minor axis of the trochoid chamber which is preferably about 30. The spark plug also has its center line 74 (see FIg. 5) making an angle 62 with a plane passing through the side wall; angle 62 is preferably about 20°. The critical criteria in determining unique orientation of the spark plugs is the requirement for obtaining alignment of the electrodes while nesting the plugs for proper installation; a thin section of cast material of the intermediate housing is maintained between the spark plugs; this section should be no less than .180 inches. This is a practical limitation obtained from the fact that the wrenching lugs of each lug will abut when this dimension is obtained between the threaded bores for the plugs. However, this practical limitation accords with the necessity for a stable web under the heat conditions to be experienced. Only with the orientation as shown in FIG. 2, can the concept of packaging and fitting symmetrically opposed spark plugs in a multiple rotor engine be achieved. The line along which the spark terminals are coincident along a common line for both rotors which requires very close nesting of the spark plugs as shown.

Combustion Flame Front

It must be emphasized that the spark plugs are symmetrically arranged on opposite sides of each trochoid chamber in a predetermined alignment. It is possible that an eight spark plug arrangement can be effectively utilized for a two rotor engine which would multiply the sets of spark plugs from that shown in FIG. 2, by another set located in a leading firing location (located lower down in FIG. 2 adjacent the leading edge of the compression pocket 50).

Test results were collected using an engine rig making it possible to fire 1, 2 or 4 spark plugs per rotor in the side housings (the 4 plug arrangement has one pair at the leading position and one pair at the trailing position of the compression pocket) and 2 plugs in the peripheral trochoid wall per rotor. These results indicated that one or two spark plugs located in the periphery of the rotor housing, in conformity with prior art constructions, consistently gave lower brake horsepower than the symmetrically arranged 2 side spark plug construction and the 4 side spark plug construction (with the pairs fired with 0° lag between them). With reference to brake specific fuel consumption, the lowest was obtained with the firing of two or four symmetrically arranged spark plugs in a trailing position in the side housing; peripherally located spark plugs gave low fuel consumption at high road load speeds/horsepower ratios. The highest fuel consumption may result when only unsymmetrical side spark plugs are fired, such as one plug only in a side housing.

The reason for improved fuel economy with this invention is explained by a modified flame front. In FIG. 7, a typical flame front for leading and trailing spark access openings in a peripheral spark port engine of the prior art is plotted. A flame front is designated by a line centered about one of the openings and has a lateral component extending along the width of combustion chamber (abscissa in millimeters0 and extends substantially forwardly in the direction of rotation (see arrow) along the length of the chamber (ordinate in millimeters measured from the minor axis of the trochoid). The different flame fronts represent the time lag from ignition to ionization represented by degrees of rotation of the eccentric shaft. Note that the flame front tends to proceed in the direction of rotation and back-up in a direction counter to rotation is relatively small. This is due to strong compression turbulence and quenching on the trailing side which slows down the flame travel counter to rotation. As shown in FIG. 7, the flame front eminating from the trailing spark access opening 190 never adequately proceeds across the chamber and leave pockets of uncombusted fuel. The trailing spark access opening 190 is smaller than the leading opening 191, for the reasons described earlier. Thus, to fully combust the mixture, the leading position is required which results in low efficiency since it is coming too late in time to do the total job.

The symmetrical side spark openings 192 in the trailing position of FIG. 8 represent the preferred mode of this invention. Note the thorough coverage of the chamber by the flame front early in ignition event. The flame propagation proceeds from opposite points of the compression pocket and has less distance to travel to provide uniform combustion of the compressed mixture within the time limit available. Maximum pressure from the flame front is reached at about 15° of eccentric shaft movement after top dead center; at this point, the pressure rise can be as high as 60 psi per degree, although a maximum rise of 40 psi/degree is more desirable. The flame front should be in the position shown for a flame front at 15°to obtain smooth operation of the engine. If the maximum pressure is reached earlier or later, considerable roughness is encountered. To obtain a maximum pressure at 15 ATDC for the trailing plug opening 190, firing must be earlier which produces negative work causing a loss in power of 11–15%. The symmetrical arrangement of this invention reduces negative work substantially.

In FIG. 9, a symmetrical side arrangement for both the leading and trailing position is shown. More than adequate flame front coverage is assured. In FIg. 10, an unsymmetrical side arrangement is shown with there being only one spark plug access opening (representing any arrangement where the openings are in one side wall only). The inadequate flame front, never adequately extending across the chamber, for the time interval of the other arrangements, is more deficient than the arrangement of FIG. 7.

Compression Pocket Design

The construction of the compression pockets 50 must be designed with such propagation in mind. As shown in FIG. 2, each pocket has a generally cross-shaped plan configuration including a central gradually dished portion with a leading section 50a and a trailing section 50b; each have a generally uniform width 66. Since communicating passages 50c of the pocket have a transverse dimension 65, the leading edge and the trailing edge of such side communicating passages determine the minimum spark advance permissible of the spark plugs. The depth of pocket 50 extends to substantially the location of the side seal strip 20 as shown in FIG. 1. The side communicating passages 50c are also generally dish shaped when viewed in silhouette as in FIG. 1. The specific contour of the compression pocket of FIG. 2 was designed to achieve a compression ratio of 8.0:1.

To provide an even greater increase in horsepower, fuel economy and resistivity to gasoline octane variation, the compression pocket 150 of FIGS. 16–19 was developed to cooperate with the side-ported spark plug arrangement of FIGS. 1–6. In essence, the normal pocket is split into two portions 151 and 152 interconnected by a shallow depression 153; each portion is defined by a tapered chamfered surface (156 and 157 respectively) along an edge (158 and 159 respectively) of the rotor 160 periphery. In cross-section, the portions and depression together appear as a penthouse configuration, that is to say, high in the middle and sloping toward the edges (see FIGS. 17 and 19). The pocket portions are symmetrical about a central plane 154 of the rotor, comparable to the symmetry of the spark plugs, and each have a leading point (161 and 162 respectively) aligned along line 155. The terminating edge (163 and 164 respectively) is arranged deeply with respect to a radius of the rotor and has a side seal strip 165 in close proximity. The length 166 of each portion is at least 66% of the arcuate length of a rotor face 167. The length 168 of the recess is about 50% of the length 167; the maximum depth 169 of the recess is no more than 15% of the maximum depth 170 of the positions 151 and 152, as viewed in FIG. 16.

Although it is not fully understood why brake specific fuel consumption should be so significantly reduced by the combination of the construction of FIGS. 16–19 and the symmetrical side ported spark plugs, it is suggested that this may be due to the fact that a greater proportion of the volume of space to be ignited is arranged more closely about a point of spark; transverse distances (across and down) to complete longation are slightly shorter. Furthermore, a stronger compression turbulence is realized with the penthouse design. The interconnecting depression 153 may be eliminated in certain designs which would make two compression pockets symmetrically arranged.

Plug Location

An early elemental test between dual peripheral and dual side spark plugs produced the results of FIG. 12. Plot 88 for dual peripheral spark plugs shows an observed brake specific fuel consumption much higher (poorer) than that for a dual side spark plug arrangement plot 89.

There is 14% fuel economy improvement at 3,000 r.p.m. with the symmetrical side arrangement of this invention. The lack of significant improvement at 2,000 r.p.m. and 6,000 r.p.m. is explained by the fact that too small of spark access opening was used for the test (less than ¼ inch diameter) thereby affecting economy at high speeds and due to the fact that the fast-acting sealing grid of this disclosure was not used which affected economy at low speeds. Plot 86 represents actual brake horsepower for the dual peripheral arrangement, which is higher than that for dual side spark plugs represented by plot 87. The 4% superiority of the peripheral arrangement is due to the fact that the engine was not constructed with the proper compression ratio and sealing grid.

Tests, in more detail, comparing an engine equipped with peripheral spark plugs and an engine equipped with side spark plugs illustrated that when a peripheral spark plug location was utilized, whether in the leading or trailing position relative to the compression pocket, the fuel consumption was fundamentally low. With dual spark plugs, one in the leading and one in the trailing position but still within the periphery of the rotor housing (having 0° of lag therebetween), fuel consumption was improved somewhat at high road load conditions but still deficient at low road load conditions. When two spark plugs were located in the symmetrical opposed positions in the side housings, it showed that in the leading position, fuel consumption was somewhat poor; however, when both were placed in the trailing position or one pair in the leading and the other pair the trailing, the lowest specific fuel consumption was observed. It was concluded that an optimum arrangement comprised opposed spark plugs in both side housings so that adequate flame propagation can proceed from two different points opposite each other and particularly in the trailing spark position.

Figure 13:
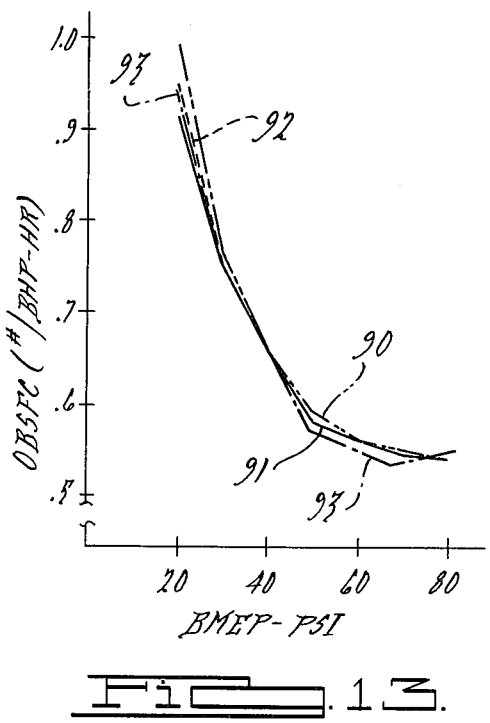

In FIG. 13, a comparison was made between different timing for firing of the spark plugs at part throttle. The brake mean effective pressure was plotted against fuel consumption. Only a four plug symmetrical side arrangement was used. Plot 90 represents 0° lag on the leading pair of spark plugs; plot 91 represents 50° lag; plot 92 represents 10° lag; and plot 93 represents 15° lag which appears to have some advantage at high loads.

It was found that the spark electrode positioning is non-critical when unobstructed and within .25 inch of the trochoid surface. But the electrode location is critical in all other respects. Optimally it should be common with the trochoid surface, but this is physically not attainable. Orientation of the oval or opening edge 21 should be with the greatest dimension along the direction of rotation.

Spark Plug Configuration

Tests were performed to investigate the influence of spark plug configuration or firing sequence to determine improvements for use with side spark openings. It showed that a rotary engine having symmetrical side openings for the spark plug is generally insensitive to the precise location or depth of the spark gap in the passages leading to the opening, unless an extreme spark plug configuration is encountered, such as having a ground electrode or by having the spark plug of the retracted gap design. The ground electrode tends to shield the initial flame propagation and causes a slight decrease in brake specific fuel consumption. The best operating spark plug configuration for the symmetrical side port construction is one with a projected core nose and particularly one which has a surface gap. A spark plug having a biased projected core nose may offer some advantage when the spark access passage is turned; the center electrode, made of silver alloy, is extended in length and curved toward the opening 21. The electrode should be orientated so that the spark gap will be approximately 1–2 millimeters below the side housing surface 31 or 28.

Figure 14:
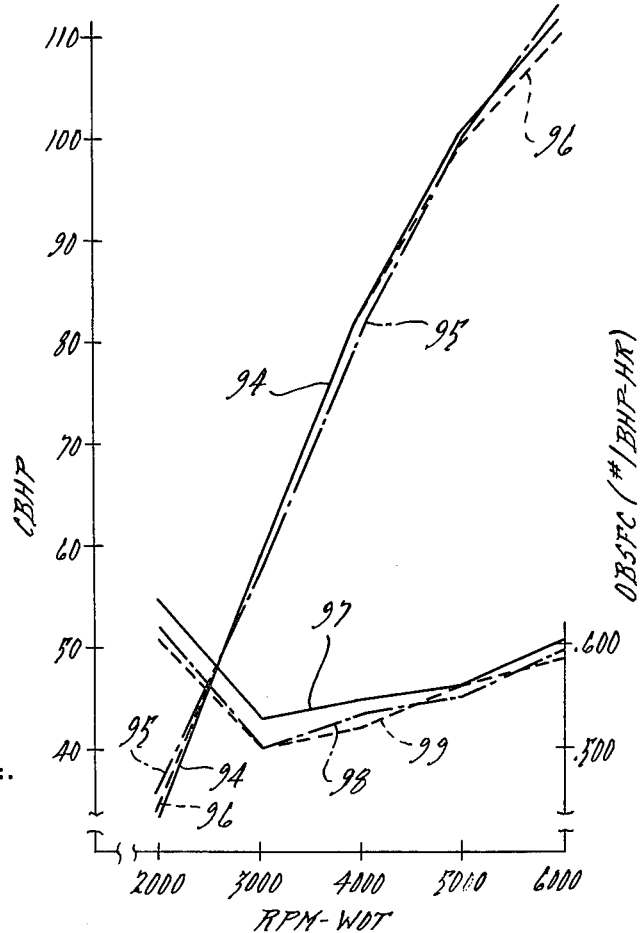
Figure 15:
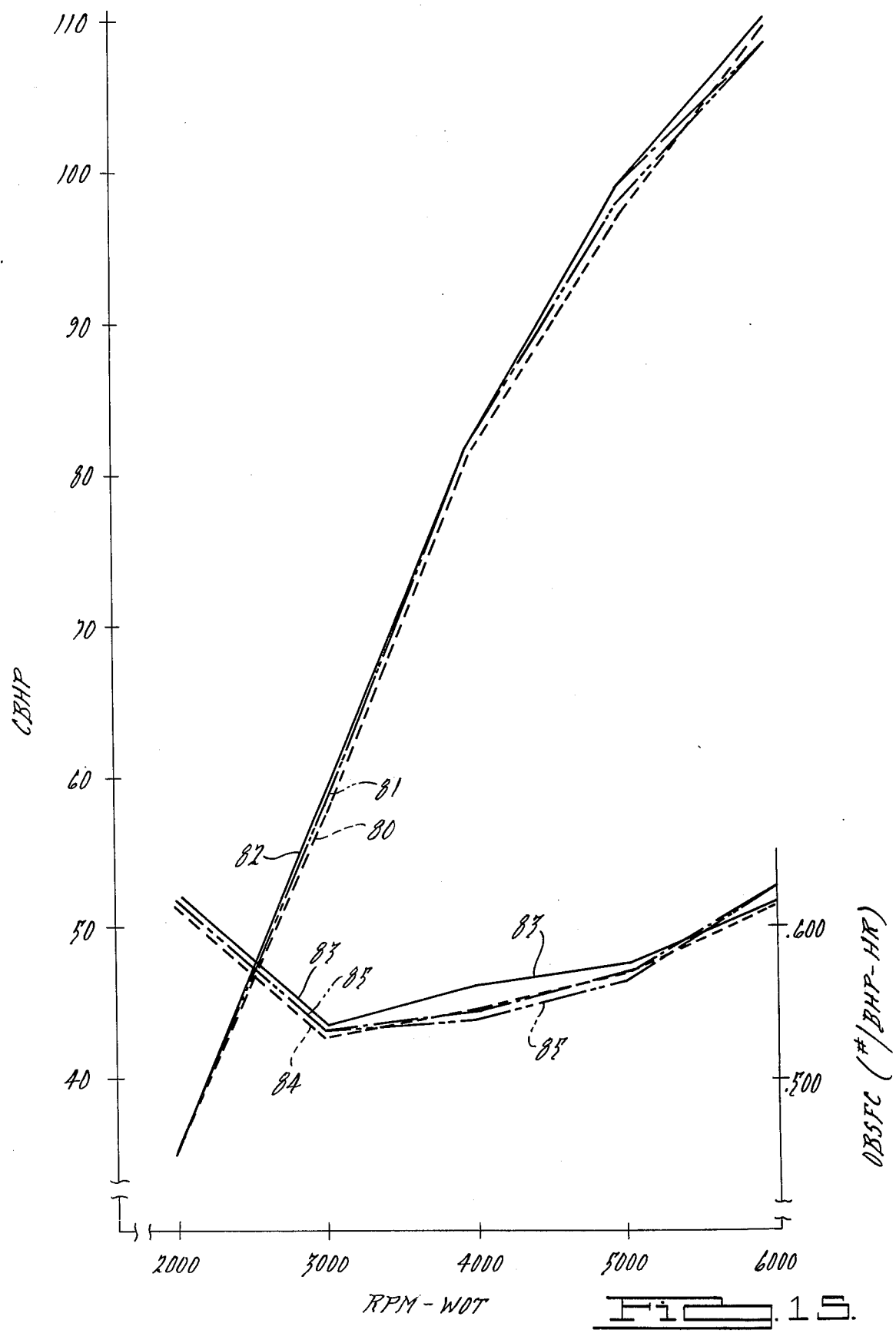

In FIG. 14, different spark plug configurations were employed in a symmetrical side-ported spark plug arrangement. Three types, one with a retracted gap, one with a standard flat gap and one with a standard gap, were used. All three types showed similar calculated brake horsepower curves (plots 94, 95 and 96). However, the standard gap and flat gap types (plots 99 and 98 respectively) showed lower observed specific fuel consumption as compared to the retracted gap type (plot 97). The flat gap type can be positioned with less obstruction to the spark access opening.

I claim as my invention:

1. For use in a rotary internal combustion engine, having a rotor moving with planetary motion within a housing, said rotor and housing together defining variable volume chambers into which a combustible mixture is inducted, said housing having a pair of side walls aligned with the direction of flow of said mixture, an ignition system comprising:
   a. means defining at least two oppositely oriented receptacles, at least one receptacle being disposed in each of said side walls and having a portion entering upon said variable volume chamber when in the smallest compressed volume condition,
   b. electrode means secured in each of said receptacles and arranged to provide a spark in said receptacle portion, and
   c. electrical supply means effective to repeatingly apply a high voltage across said electrodes to provide said spark at each event where a chamber enters into communication with said two oppositely oriented receptacle portions, said sparks causing at least two flame fronts in said mixture to proceed toward each other transverse to said mixture flow.

2. An ignition system as in claim 1, in which the receptacle portions are aligned along a common line transverse to said flow.

3. An ignition system as in claim 1, in which an opening is defined by each of said receptacle portions intersecting with a side wall, said openings having the smallest dimension thereof equal to or greater than one-fourth of an inch to increase the access of said spark to the associated variable volume chamber.

4. An ignition system as in claim 1, in which said receptacle portion is defined as a uniform cylinder which results in the definition of a substantially elliptical opening at the intersection with said side wall.

5. The ignition system as in claim 4, in which the greatest dimension of said elliptical opening is generally aligned with the direction of flow.

6. An ignition system as in claim 1, in which said flame fronts proceed simultaneously from said oppositely oriented openings toward the center line of said flow, said flame fronts being symmetrically arranged about said center line.

7. For use in a rotary internal combustion engine having a rotor moving about an eccentric shaft with planetary motion within a housing, an ignition system for igniting a combustible mixture inducted into said engine, the combination comprising:
   a. an engine housing having a pair of side walls aligned with the direction of flow of said mixture,
   b. a rotor mounted for planetary movement within said housing having a pair of substantially flat side walls arranged adjacent the side walls of said housing and having a non-linear outer periphery defined with a plurality of compression pockets therein and open to the sides of said rotor,
   c. means on said rotor for providing a dynamic sealing engagement between said rotor and housing to define variable volume chambers therebetween, and
   d. means disposed in each of said side walls of said housing, for igniting said mixture, said igniting means being symmetrically arranged about the center line of said flow, and having electrodes axially arranged subjacent the side walls of said housing and circumferentially arranged to align with the trailing quadrant of said compression pocket when in communication with the electrodes for firing.

8. The combination as in claim 7, said housing has a trochoid end wall interconnecting said side walls, and in which said sealing means on said rotor comprises a bifurcated sealing strip disposed in a slot of said rotor effective to adjust to lateral shifting of said side walls for maintaining continuous contact therewith, said strip having a crown portion effective to provide a line contact with said trochoid end wall and having side surfaces effective to mate with the sides of said rotor slot, the ends of said strip having a configuration larger than any dimension of said spark plug access opening in order to eliminate gas blow-by.

9. The combination as in claim 7, in which each of said rotor compression pockets are defined with a central elongated cavity portion having transverse channels communicating with the sides of said rotor in order to provide communication between said spark electrodes and said cavity portion.

10. The combination as in claim 7, in which said compression pockets are formed as tapered chamfered portions along opposite edges of said rotor whereby each chamfered portion is in communication respectively with one of said side mounted sparking electrodes.

11. The combination as in claim 10, in which each pair of chamfered portions are interconnected by a depression extending transversely across the periphery of said rotor.

12. The combination as in claim 10, in which the greatest depth of each chamfered portion is generally equal in both a direction transverse to the axis of said rotor or parallel to the axis of said rotor.

13. The combination as in claim 7, in which said igniting means comprises at least two pair of spark plugs for each rotor, one pair of plugs being positioned subjacent said side walls and in the leading position relative to said compression pocket and the other pair of plugs being positioned to communicate with the trailing location of said compression pocket.

14. The combination as in claim 13, in which there is a 15° lag in the firing of said leading pair of spark plugs with respect to said trailing spark plugs as determined by movement of the eccentric shaft.

15. For use in a rotary internal combustion engine having a rotor moving with planetary movement within a housing, said rotor and housing together defining variable volume chambers into which a combustible mixture is inducted, said housing having a pair of side walls aligned with the direction of flow of said mixture, an ignition system comprising:
   a. means symmetrically defining electrode structures subjacent the side walls of said housing for subjecting said combustible mixture to simultaneous ignition points to develop a flame front proceeding from aligned opposite sides of said housing,
   b. electrical supply means having a breakerless distributor and being effective to sequentially supply a high voltage for promoting a spark across each of said electrode structures at each event where a chamber enters into communication with said symmetrical electrode structures, said supply means having structure for advancing the timing of the spark under light loads of said engine, said advance being less than 35° to obtain optimum fuel economy and power under said light loads.

16. An ignition system as in claim 15, wherein the rotary internal combustion engine is of the multiple rotor type, said housing having an intermediate section interposed between rotors, said electrode structures being carried by elongated spark plugs, the electrode structures being arranged on a common line parallel to the axis of said rotors and said elongated spark plugs in at least the intermediate section being mounted at an angle with respect to a side wall of said intermediate housing of at least 20° and at an angle with the axis of said rotors of at least 20°, said spark plugs in the intermediate housing being oriented opposite to each other.

17. The ignition system as in claim 15, in which each of said electrode structures are of the open gap type.

18. The ignition system as in claim 15, in which said electrode structures have a projected electrode which is arranged so that the gap therein is oriented toward the access opening in said side walls.

19. The ignition systeme as in claim 16, in which said spark plugs in the intermediate section are superimposed when viewed in elevation along a line parallel to flow adjacent the plugs.

* * * * *